US008849432B2

(12) United States Patent
Moorer (10) Patent No.: US 8,849,432 B2
(45) Date of Patent: Sep. 30, 2014

(54) ACOUSTIC PATTERN IDENTIFICATION USING SPECTRAL CHARACTERISTICS TO SYNCHRONIZE AUDIO AND/OR VIDEO (75) Inventor: James A. Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 1472 days.

(21) Appl. No.: 11/809,615

(22) Filed: May 31, 2007

(65) Prior Publication Data

US 2013/0121662 A1 May 16, 2013

(51) Int. Cl.
G06F 17/00 (2006.01)
H04N 5/91 (2006.01)
H04N 21/439 (2011.01)
G11B 27/28 (2006.01)
G11B 27/10 (2006.01)
H04N 5/77 (2006.01)
H04N 21/4223 (2011.01)
G11B 20/00 (2006.01)
G10L 15/00 (2013.01)
H04N 21/43 (2011.01)
H04N 5/765 (2006.01)

(52) U.S. Cl.
CPC .............. H04N 5/91 (2013.01); H04N 21/4307 (2013.01); H04N 21/4394 (2013.01); G11B 27/28 (2013.01); G11B 27/10 (2013.01); H04N 5/772 (2013.01); H04N 21/4223 (2013.01); G11B 20/00 (2013.01); H04N 5/765 (2013.01); G10L 15/00 (2013.01); H04H 2201/90 (2013.01)
USPC ........................................................ 700/94

(58) Field of Classification Search
USPC ............. 381/56; 386/201, 239, 248; 704/200, 704/205, 211, 216, 218, 219; 700/94
See application file for complete search history.

(56) References Cited

U.S. PATENT DOCUMENTS

| 4,624,009 | A | * | 11/1986 | Glenn et al. ................... 704/231 |
| 5,040,081 | A | * | 8/1991 | McCutchen .................. 386/207 |
| 5,202,761 | A | * | 4/1993 | Cooper ......................... 348/515 |
| 5,522,012 | A | * | 5/1996 | Mammone et al. ........... 704/250 |
| 5,612,729 | A | * | 3/1997 | Ellis et al. ........................ 725/22 |
| 6,477,490 | B2 | * | 11/2002 | Nakatoh et al. ............. 704/200.1 |
| 6,480,902 | B1 | | 11/2002 | Yuang et al. |
| 6,512,884 | B1 | | 1/2003 | Sawada |
| 6,687,672 | B2 | * | 2/2004 | Souilmi et al. ................ 704/237 |
| 6,744,815 | B1 | | 6/2004 | Sackstein et al. |
| 6,751,354 | B2 | * | 6/2004 | Foote et al. ................... 382/224 |
| 6,990,453 | B2 | * | 1/2006 | Wang et al. ................... 704/270 |
| 7,027,124 | B2 | * | 4/2006 | Foote et al. ....................... 352/1 |
| 7,057,663 | B1 | | 6/2006 | Lee |
| 2002/0181711 | A1 | * | 12/2002 | Logan et al. ...................... 381/1 |
| 2004/0093202 | A1 | * | 5/2004 | Fischer et al. ................ 704/216 |
| 2004/0148159 | A1 | * | 7/2004 | Crockett et al. .............. 704/211 |
| 2004/0165730 | A1 | * | 8/2004 | Crockett ........................ 381/56 |
| 2004/0172240 | A1 | * | 9/2004 | Crockett et al. .............. 704/205 |
| 2004/0221237 | A1 | * | 11/2004 | Foote et al. ................... 715/700 |
| 2005/0042591 | A1 | * | 2/2005 | Bloom et al. ............. 434/307 A |
| 2005/0060753 | A1 | | 3/2005 | Lundblad et al. |
| 2005/0177372 | A1 | * | 8/2005 | Wang et al. ................... 704/273 |
| 2005/0228663 | A1 | * | 10/2005 | Boman et al. ................ 704/235 |
| 2005/0232411 | A1 | * | 10/2005 | Srinivasan et al. ............ 379/413 |

(Continued)

Primary Examiner — Joseph Saunders, Jr.
(74) Attorney, Agent, or Firm — Wolfe-SBMC (57) ABSTRACT Embodiments of the invention relate generally to computing devices and systems, software, computer programs, applications, and user interfaces for identifying acoustic patterns, and more particularly, to determining equivalent portions of audio using spectral characteristics to, for example, synchronize audio and/or video captured at multiple cameras or different intervals of time.

25 Claims, 8 Drawing Sheets (56) References Cited

U.S. PATENT DOCUMENTS

| | | |
|---|---|---|
| 2005/0238059 A1 | 10/2005 | Lundblad et al. |
| 2005/0281246 A1 | 12/2005 | Seo et al. |
| 2005/0281437 A1 | 12/2005 | Fruchter et al. |
| 2006/0002681 A1 | 1/2006 | Spilo et al. |
| 2006/0017846 A1 | 1/2006 | Kim |
| 2006/0078305 A1 | 4/2006 | Arora et al. |

* cited by examiner

ACOUSTIC PATTERN IDENTIFICATION USING SPECTRAL CHARACTERISTICS TO SYNCHRONIZE AUDIO AND/OR VIDEO

FIELD OF THE INVENTION

Embodiments of the invention relate generally to computing devices and systems, software, computer programs, applications, and user interfaces for identifying acoustic patterns, and more particularly, to determining equivalent portions of audio using spectral characteristics to, for example, synchronize audio and/or video captured at multiple cameras or different intervals of time.

BACKGROUND OF THE INVENTION

When editing audio and video captured either by multiple cameras or in multiple takes of the same scene (e.g., with a single audio-video capture device), traditional media editing applications typically operate on the premise that audio portions captured at different cameras angles are coextensive with the captured video, and, thus, align at a common point in time. But this is often not the case. In practice, audio in multiple takes vary due slight variances in delivery, volume, word usage, utterances, etc. For example, the actors can ostensibly deliver the same lines in each take, but they might inevitably differ somewhat in timing. Sometimes they will actually say slightly different things as well, which varies the audio from take to take. Whereas, in multiple camera applications, the spatial arrangement of the cameras, as well as the environment, can also contribute to deviations in audio relative to some point in time. These deviations, which can be as small as a fraction of a second, can lead to two or more captured audio portions being out of synchronization as perceived, for example, by a human listener. Further, the efforts to edit audio and video captured in digitized form are usually exacerbated by the amounts of raw audio and video requiring editing. Specifically, editors typically expend much effort, usually manually, to search through significant amounts of content to find audio that can be synchronized for use in a final product.

Figure 1:
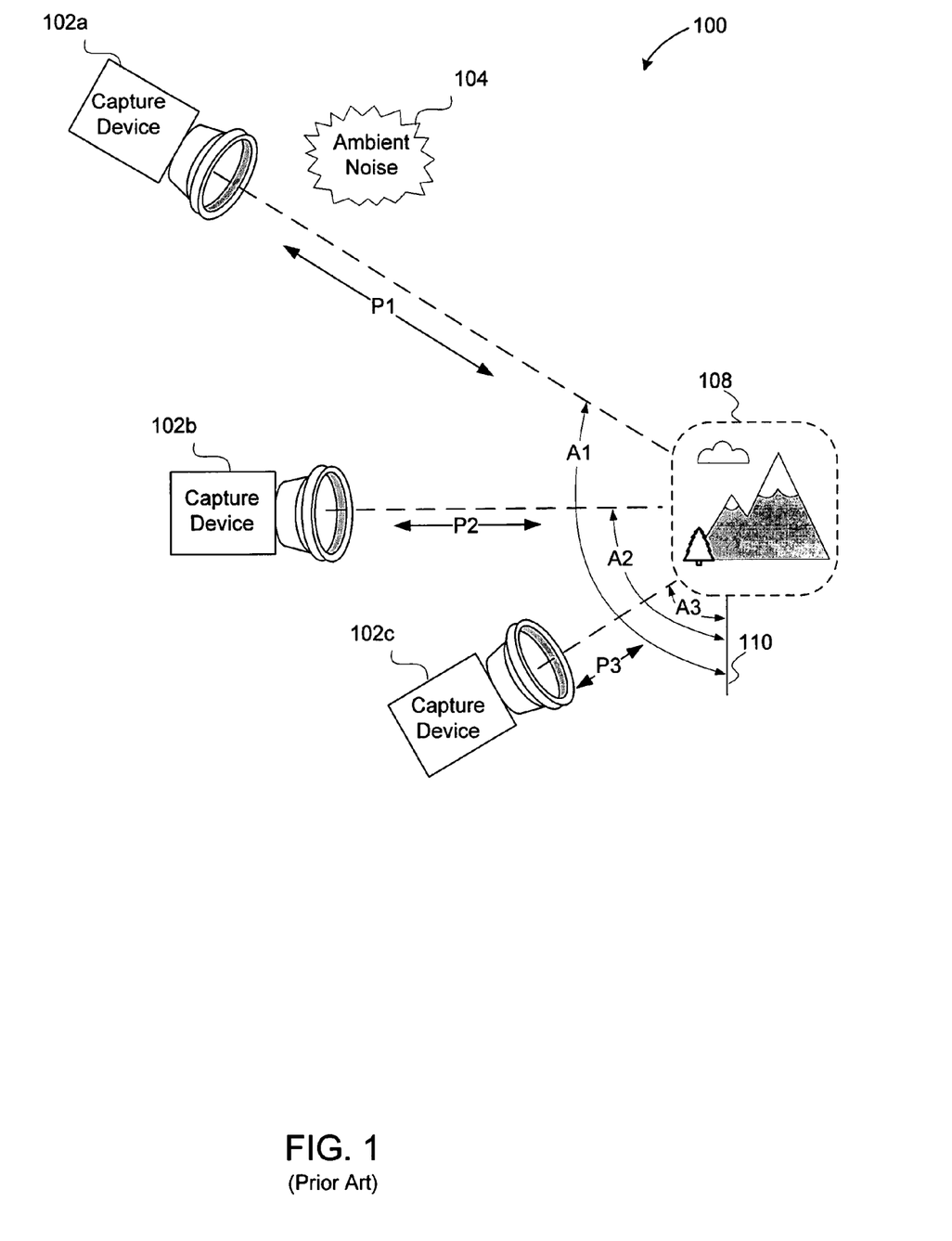
FIG. 1 illustrates a multi-camera arrangement for capturing video and audio of a subject at different angles and positions.

FIG. 1 illustrates a multi-camera arrangement 100 for capturing video and audio of a subject 108 at different angles and positions. As shown, capture devices 102a, 102b, and 102c, which are typically cameras, are arranged at different angles A1, A2, and A3 relative to reference 110. Further, these capture devices are positioned at different positions, P1, P2, and P3 in space from subject 108. In this typical multi-camera arrangement 100, these angles and positions, as well as other various factors, such as the occurrence of ambient noise 104 near capture device 102a, affect the synchronization (and/or the quality) of the audio portions as they are captured. In addition, multiple takes of the same scene, whether it is with multiple cameras or a single camera, can have inherent deviations (e.g., different rate of delivery of speech, differing utterances that can include different spoken words) among the other deviations stated above.

One common technique for identifying similar video captured at capture devices 102a, 102b, and 102c is to implement time codes associated with each video (or otherwise use some sort of global synchronization signal) to synchronize both the video and audio portions. In particular, a user is usually required to manually adjust the different videos to bring their time codes into agreement. A time code normally describes the relative progression of a video images in terms of an hour, minute, second, and frame (e.g., HH:MM:SS:FR). But a drawback to using time codes to identify similar audio (e.g., to synchronize audio) requires the user to identify different video portions to a particular frame before synchronizing the audio portions. The effort to identify similar audio portions is further hindered due to the number of samples of audio sound that is captured relative to the number of video frames. Typically, for each frame of video (e.g., 30 frames per second), there are 1,600 samples of audio (e.g., 48,000 samples per second). As such, audio portions for capture devices 102a, 102b, and 102c are typically synchronized based on the video portions and their time codes, which can contribute to undesired sound delays and echoing effects. Another common technique for synchronizing the audio (and the video) captured at capture devices 102a, 102b, and 102c is to use a clapper to generate a distinctive sound during the capture of the audio and video. A clapper creates an audible sound—as a reference sound—to synchronize audio during the capture of the audio. The clapper sound is used for editing purposes and would otherwise be discarded during editing. The time codes and clapper sounds thus require effort to ensure their removal as they are intended for editing purposes and are distracting to an audience if time codes remain visible or clapper sounds remain audible in the final product. A drawback to using a clapper as noise 104 to synchronize audio is that the distance from noise and capture devices 102a, 102b, and 102c can cause delays that hinder synchronization of the audio relating to scene 108.

It would be desirable to provide improved computing devices and systems, software, computer programs, applications, and user interfaces that minimize one or more of the drawbacks associated with conventional techniques for identifying acoustic patterns to, for example, synchronize either audio or video, or both.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most

DETAILED DESCRIPTION

Figure 2A:
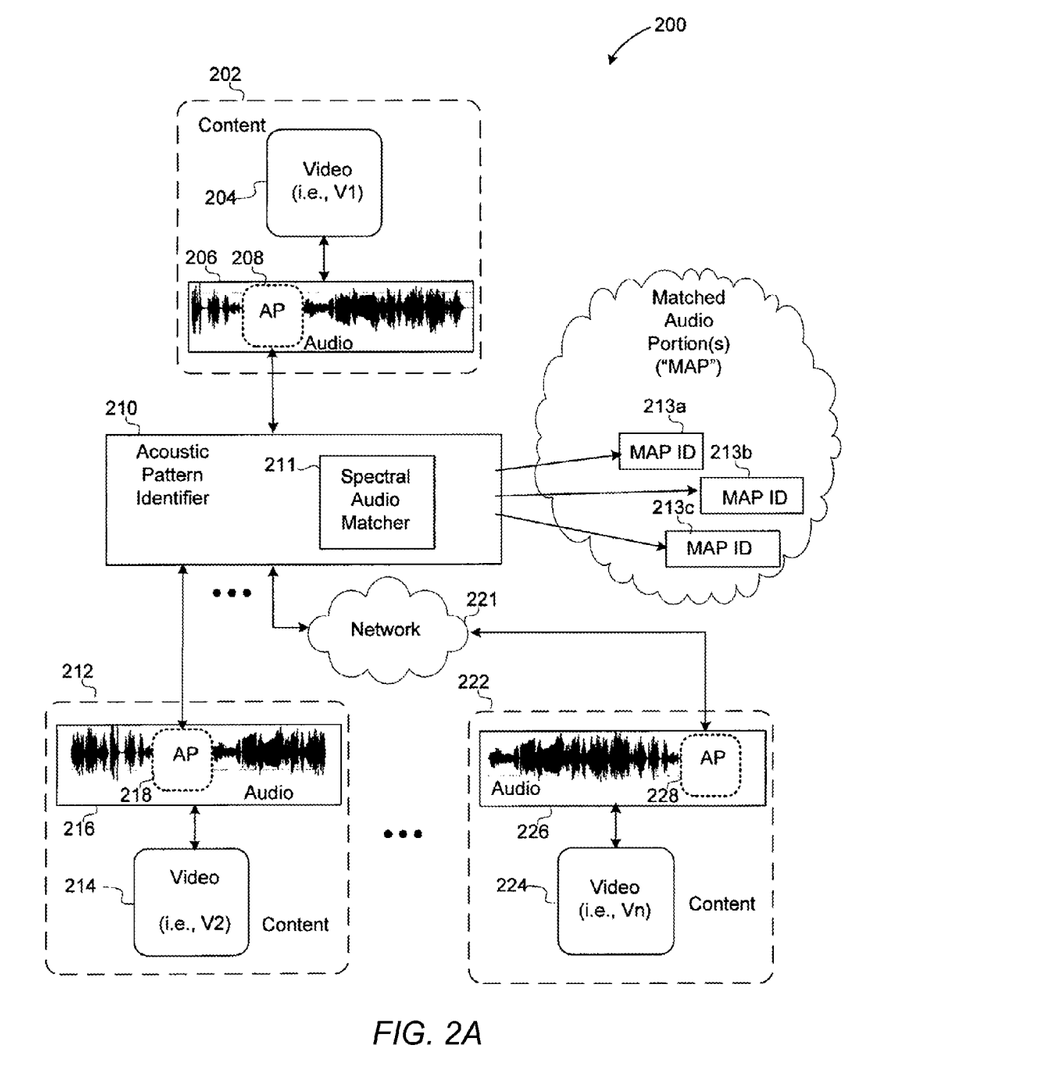
FIG. 2A is a diagram of an acoustic pattern identifier that is configured to identify equivalent audio in portions of audio, according to at least one embodiment of the invention.

FIG. 2A is a diagram 200 of an acoustic pattern identifier that is configured to identify equivalent audio, according to at least one embodiment of the invention. Acoustic pattern identifier 210 can be configured to analyze different portions of content, such as in content 202, 212, and 222, for identifying equivalent acoustic patterns in audio portions, such as in audio 206, 216, and 226, which are respectively associated with portions of video, such as in video 204, 214, and 224. Different content portions can be captured by different cameras in a multiple-camera arrangement. Or, the different content portions can be captured by one or more cameras in multiple takes of the same scene during different intervals of time. Note that the content portions can be distributed over any number of locations via, for example, network 221. Acoustic pattern identifier 210 includes a spectral audio matcher 211 that can be configured to use spectral characteristics to identify audio portions, such as audio portions ("APs") 208, 218, and 228, that have matching acoustic patterns. In one embodiment, acoustic pattern identifier 210 can generate matched audio portion identifiers ("MAP ID") 213a, 213b, and 213c such that each identify at least one portion of audio at which a corresponding portion of content 202, 212, and 222 is (or is substantially) equivalent. Thus, matched audio portion identifiers 213a, 213b, and 213c can indicate equivalent audio in audio 206, 216, and 226, which, in turn, can facilitate the synchronization of video 204, 214, and 224. In one embodiment, acoustic pattern identifier 210 can be configured to analyze a spectral characteristic associated with, for example, audio portion 208, and to determine whether one or more spectral characteristics for audio portions 218 and 228 indicate that the audio portions are equivalent (or substantially equivalent). In some instances, matched audio portions 208, 218, and 228 can each represent a synchronization point for at least audio 206, 216, and 226. Thus, acoustic pattern identifier 210 can provide for the identification of equivalent audio based on spectral characteristics for the purposes of, for example, synchronizing at least two portions of audio and/or video that can be captured, for example, at multiple capture devices (e.g., multiple cameras) or during multiple takes of the same scene.

Figure 2B:
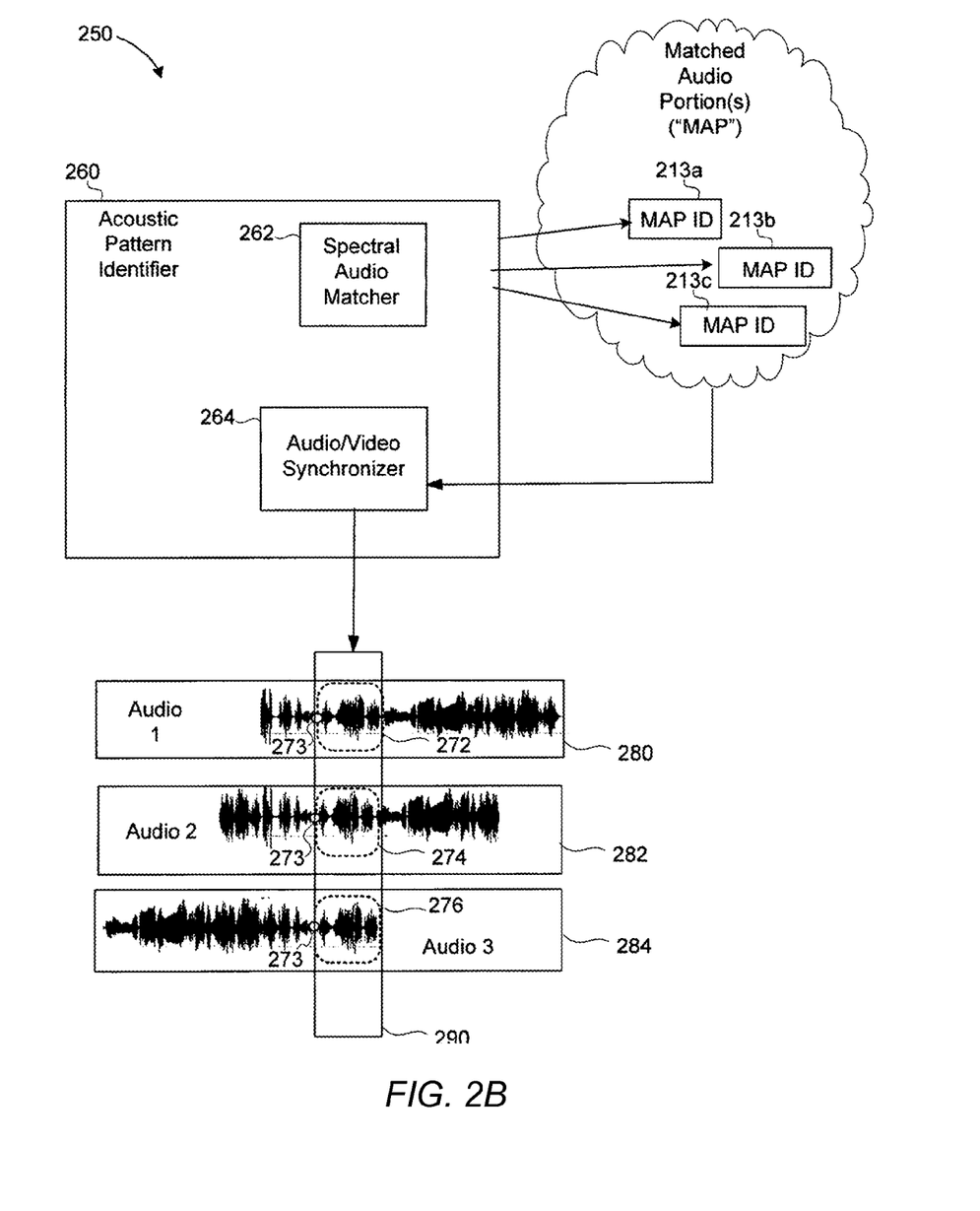
FIG. 2B is a diagram depicting an acoustic pattern identifier that is configured to synchronize audio portions, according to at least one embodiment of the invention.

FIG. 2B is a diagram 250 depicting an acoustic pattern identifier that is configured to synchronize audio portions, according to at least one embodiment of the invention. Acoustic pattern identifier 260 and spectral audio matcher 262 can be configured to include structure and/or functionality of similarly-named elements shown in FIG. 2A. In this example, acoustic pattern identifier 260 also includes an audio/video synchronizer 264 configured to synchronize two or more portions of audio. In one embodiment, audio/video synchronizer 264 can be configured to receive the outputs of spectral audio matcher 262. Examples of such outputs include matched audio portion identifiers 213a, 213b, and 213c that identify respective matching audio portions 272, 274, and 276 over different audio ("Audio 1") 280, ("Audio 2") 282, and ("Audio 3") 284. In operation, audio/video synchronizer 264 can determine either a synchronization point 273 or a range of synchronization 290 at which matching audio portions 272, 274, and 276 are in (or can be placed in) synchronicity. Further, audio/video synchronizer 264 can be configured to synchronize video 204, 214, and 224 of FIG. 2A using synchronized matching audio portions 272, 274, and 276, respectively. In at least one embodiment, acoustic pattern identifier 260 can be configured to select a portion of video 204 of FIG. 2A as a reference video ("V1"), and to analyze audio portion 208 of FIG. 2A against audio portions 218 and 228 of FIG. 2A to synchronize with video ("V2") 214 and ("V3") 224, respectively, of FIG. 2A.

In view of the foregoing, acoustic pattern identifiers 210 and 260 of FIGS. 2A and 2B, respectively, can implement spectral characteristics to identify matching audio portions for a variety of applications, including, but not limited to, synchronizing audio and video for producing media, such as movies or videos. In various embodiments, a spectral characteristic can be resistant to additive noise and amplitude variations for audio waveforms that include speech. As such, an acoustic pattern identifier in accordance with at least one embodiment can match audio having different amplitudes due to, for example, different audio being captured at different angles of multiple cameras. The different audio can be affected by differences in tone, background noise, volume, and the like. A spectral characteristic can also facilitate matching audio that can include speech that is spoken at different rates, for example, over multiple takes of the same scene, or with some variants in speech. For example, actors might deliver their lines at different speeds over multiple takes, and they might say different things as well. An actor might say "hi dude" in one take, but might say "yeah, hi dude" in another take, with the latter including a variant in speech (i.e., the word "yeah"). As such, an acoustic pattern identifier of at least one embodiment can match audio that includes speech spoken with either different cadences used by an actor over multiple takes of the same scene, or with additions or omissions of utterances and/or words, such as "uh" spoken in one scene and "ah-uh" in another. Further, the use of spectral characteristics reduces the necessity to find similar parts of audio by using either strings of words (e.g., by matching text), or phonemes, which are basic distinctive units of speech sounds that constitute intelligible speech, including words. The computational overhead to implement word-based matching in a speech recognition processes, as well as deviations from the spoken script (e.g., actors deviating from the script and in delivery for each of multiple takes of a scene), can affect the matching of words. Matching phonemes usually require matching phonetic labels or other values representing similar sounds, such as "uh," "oh," and the like. Phonetic labeling may not provide a sufficient number of possible phonemes, especially when multiple persons speak either serially or concurrently. In addition, the implementation of acoustic pattern identifiers 210 and 260 can conserve resources and computational overhead by reducing the need to implement speech recognition hardware and/or software processes to match words and/or phonemes for the purposes of finding matching audio portions. Also, the implementation of acoustic pattern identifiers 210 and 260 can synchronize at least two portions of the after the two portions of audio are captured.

As used herein, the term "spectral characteristic" refers generally, at least in one embodiment, to an attribute characteristic, property, quality or state, of audio (or a portion thereof) that can be used to determine whether two or more portions of audio are either equivalent or are not equivalent. A spectral characteristic can be numeric or otherwise, and can describe—in whole or in part—a portion of audio in terms of, or based on, frequency and/or power distribution (e.g., over frequencies). In one embodiment, the determination of a spectral characteristic can be either a sufficient step or an intermediary step for generating a spectral signature. In some examples, spectral characteristics can relate to a shape (or pattern) of frequency spectra (e.g., in terms of amplitude and frequency), or can be spectral coefficients. As used herein, the term "spectral signature" refers generally, at least in one embodiment, to a sample of a portion of audio that can be expressed in terms of a spectral characteristic, such as a spectral coefficient. In various embodiments, a degree of correlation for spectral signatures among different audio portions can be calculated to determine the similarity between samples of audio portions. As used herein, the term "spectral coefficient" refers generally, at least in one embodiment, to a representation of amplitude (e.g., a value indicating acoustic energy) at a specific frequency. Examples of spectral coefficients include Fourier series coefficients, layered (or low energy) coefficients, auto-correlation coefficients, linear prediction coefficients, and the like, as well as cepstral coefficients, such as linear prediction-based cepstral coefficients ("LPCC"), Fast Fourier Transform ("FFT")-based cepstral coefficients, MEL cepstrum coefficients, and the like.

As used herein, the term "matched audio portions" refers generally, at least in one embodiment, to portions of audio having equivalent (or substantially equivalent) spectral signatures, or spectral coefficient-based measures, such as distances, with which to correlate different spectral signatures. Note that matched audio portions can include variant audio, such as is the case with audio portions captured during multiple takes of the same scene where actors might speak at different rates of speech, interject or omit different words, and the like. Regardless, acoustic pattern identifiers of various embodiments can be configured to correlate audio portions with variant audio to form matched audio portions based on the equivalency of, for example, spectral signatures. As used herein, the term "acoustic pattern" refers generally, at least in one embodiment, to the groupings (e.g., sequences) of either spectral signatures or spectral coefficient-based measures, such as distances, or both. Such groupings can indicate matched audio portions. In one embodiment, the magnitude of the spectral coefficient-based measures, such as distances, can be used to determine trough distances, which signify matching audio portions. In a specific embodiment, a relationship (e.g., a linear relationship) between spectral signatures and their distances provide for an acoustic pattern that is indicative of matching audio portions.

As used herein, the term "audio" refers generally, at least in one embodiment, to one or more sounds that are audible (e.g., perceived by humans), and can be of or relate to the transmission, storage, reproduction or reception of sound. For example, audio can be in the form of an audio waveform, an audio file, an audio signal, an audio clip, an audio track, and the like. As used herein, the term "video" refers generally, at least in one embodiment, to one or more images that are visible (e.g., perceived by humans), and can be of or relate to the transmission, storage, reproduction or reception of images. For example, video can be in the form of a video waveform, a video file, a video signal, a video clip, a video track, and the like. As used herein, the term "content" refers generally, at least in one embodiment, to information and/or material presented within a display, an interface, or the like, in relation to, for example, an audio and/or visual presentation of sounds and/or imagery. Examples of content include text, such as an electronic document (e.g., a document in Portable Document Format ("PDF")), as well as audio, images, audio/video media, such as Flash® presentations, text, and the like. As such, a content file (or media file) can include a digital data file which is composed of images, sound and words for one camera angle. As used herein, the term "panel," at least in one embodiment, can refer to displays, palettes, tabs, windows, screens, portions of an interface, and the like.

Figure 3A:
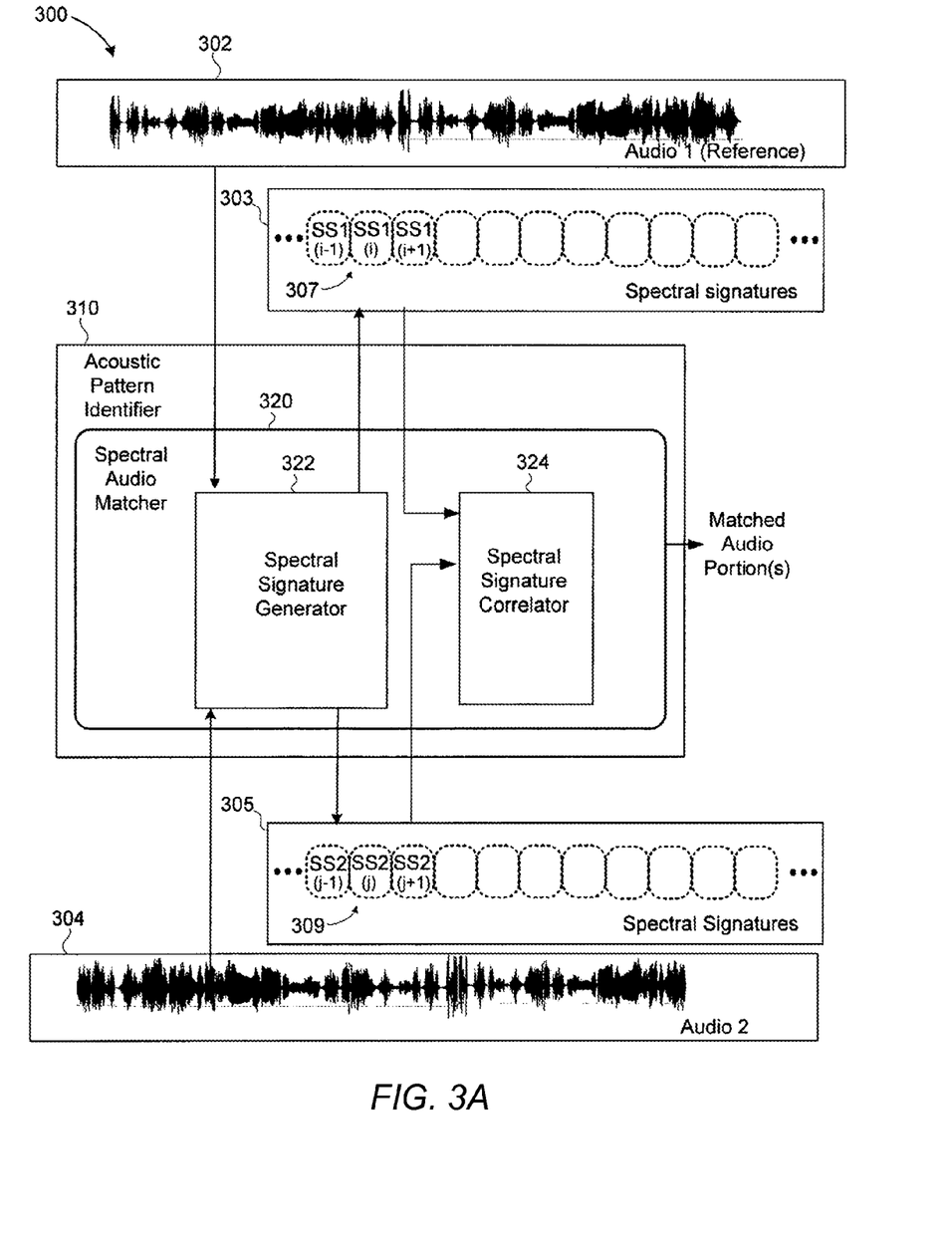
FIG. 3A is a diagram depicting an acoustic pattern identifier that is configured to generate spectral signatures with which to determine matching audio, according to at least one embodiment of the invention.

FIG. 3A is a diagram 300 depicting an acoustic pattern identifier that is configured to generate spectral signatures with which to determine matching audio, according to at least one embodiment of the invention. Acoustic pattern identifier 310 can operate to compare one portion of audio (e.g., as a reference audio) with other portions of audio (e.g., as specimen audio(s)) to determine equivalent (or substantially equivalent) portions of audio that match. In this example, acoustic pattern identifier 310 includes a spectral audio matcher 320 to determine matched audio portions. Further, spectral audio matcher 320 can include a spectral signature generator 322 and a spectral signature correlator 324. Spectral signature generator 322 can be configured to generate spectral signatures, and spectral signature correlator 324 can be configured to correlate one or more subsets of the spectral signatures to determine one or more audio portions that match.

To illustrate the operation of spectral signature generator 322 and a spectral signature correlator 324, consider the following example. As is shown, spectral signature generator 322 can be configured to analyze audio ("Audio 1") 302 and audio ("audio 2") 304 to generate arrangements (e.g., vectors) (not shown) of spectral signatures 303 and 305, respectively. In particular, spectral signature generator 322 can generate a spectral signature 307 at each unit of time, such as spectral signatures SS1 at i−1, SS1 at i, SS1 at i+1 for audio 302, and can generate a spectral signature 309 at each unit of time, such as spectral signatures SS2 at j−1, SS2 at j, SS2 at j+1 for audio 304. In one embodiment, one spectral signature 307 and one spectral signature 309 can be generated at each $1/100^{th}$ of a second. Spectral signature correlator 324 can be configured to calculate a correlation (or a degree of correlation) among spectral signatures 303 and 305. In one embodiment, spectral signature correlator 324 can determine a calculated correlation between a specific spectral signature 307 and a specific spectral signature 309, whereby groupings of calculated correlations can be indicative of matching audio portions between audio 302 and audio 304. In one embodiment, the calculated correlations between spectral signature 307 and spectral signature 309 can be distances.

Figure 3B:
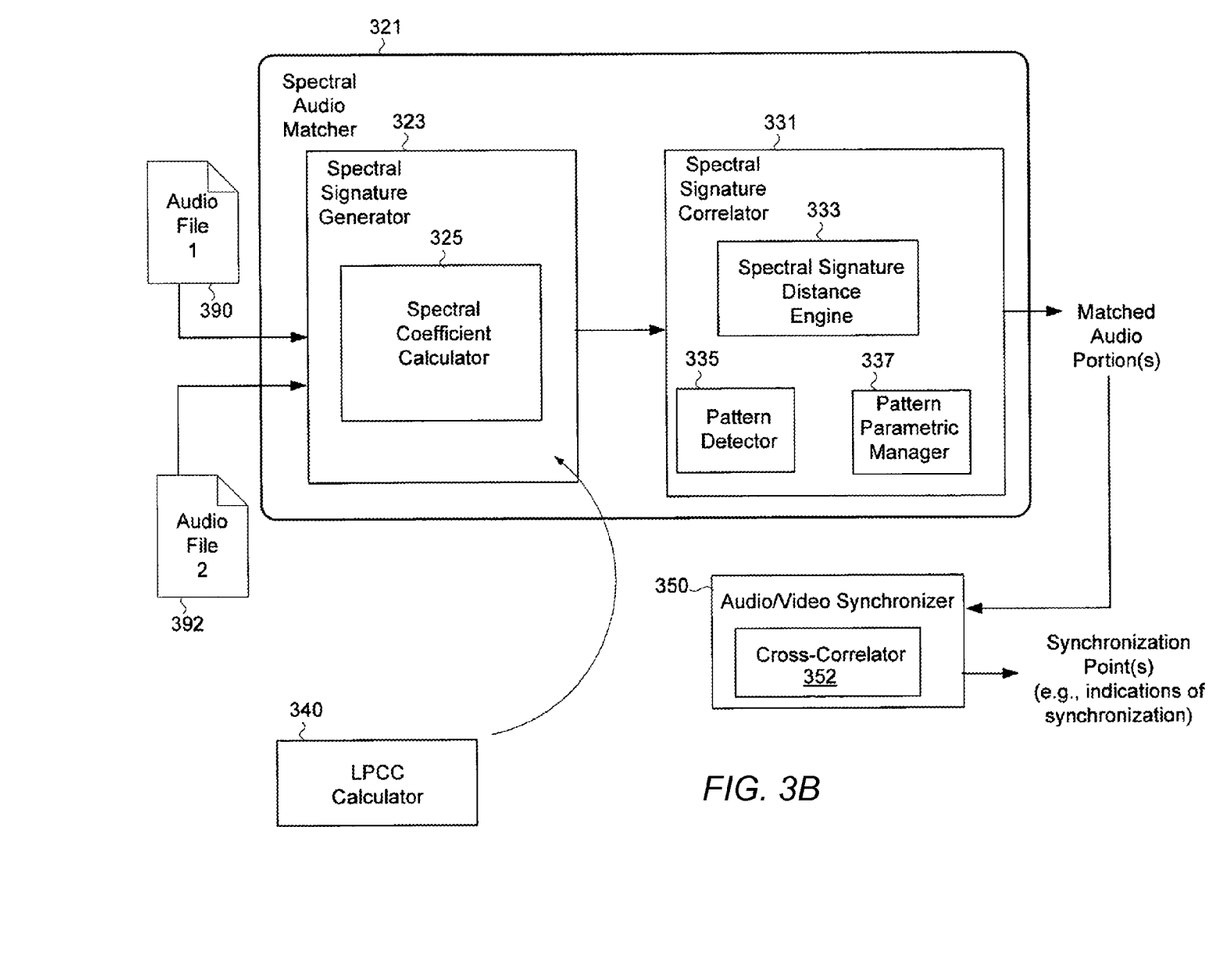
FIG. 3B illustrates a spectral audio matcher, according to at least one embodiment of the invention.

FIG. 3B illustrates a spectral audio matcher, according to at least one embodiment of the invention. Spectral audio matcher 321 is shown to include spectral signature generator 323 and spectral signature correlator 331. In this example, spectral audio matcher 321 includes a spectral coefficient calculator 325 that can be configured to generate spectral signatures based on spectral coefficients. In operation, spectral audio matcher 321 analyzes audio from two or more audio files, such as audio file ("1") 390 and audio file ("2") 392 to determine whether any portions match. In some cases, the audio from either or both of audio file 390 and audio file 392 can reside in a repository or can be acquired by receiving streaming audio from over a network (not shown).

In a specific embodiment, spectral coefficient calculator 325 can be configured to operate as a linear prediction-based cepstral coefficient ("LPCC") calculator 340 to characterize portions of audio based on cepstral coefficients, such as linear prediction-based cepstral coefficients. In one example, spectral coefficient calculator 325 implementing linear prediction-based cepstral coefficient calculator 340 can generate linear prediction-based cepstral coefficients as follows. One or more of spectral audio matcher 321, spectral signature generator 323, and spectral coefficient calculator 325—either alone or in combination—can digitize audio from either audio file 390 or audio file 392, and, in some cases, subdivide the audio into frames over which linear prediction coefficients ("LPCs") can be generated.

Linear prediction-based cepstral coefficient calculator 340 can convert the linear prediction coefficients into linear prediction-based cepstral coefficients. In some instances, spectral coefficient calculator 325 can implement the Levinson-Durbin algorithm, as is known, to generate the linear prediction-based cepstral coefficients. In at least one embodiment, linear prediction-based cepstral coefficient calculator 340 can calculate linear prediction-based cepstral coefficients in accordance with an inverse z-transform of the logarithm of the spectrum. In some cases, spectral signature generator 323 can generate a portion of the linear prediction-based cepstral coefficients using at least a frequency domain, with the linear prediction-based cepstral coefficients being in the time domain. In a specific embodiment, linear prediction-based cepstral coefficient calculator 340 can implement about 14 linear prediction-based cepstral coefficients, which can represent a spectral shape in a level-independent manner. In some instances, the linear prediction-based cepstral coefficients are quantized (or include a degree of quantization) in accordance with a k-means Vector Quantization algorithm—which is known—to form, for example, an 8-bit number to represent a spectral signature.

In one embodiment, spectral coefficient calculator 325 is configured to generate linear prediction-based cepstral coefficients as spectral signatures at a rate that can be in the fractions of a second, such as one generated linear prediction-based cepstral coefficient per $1/100^{th}$ of a second. As such, spectral coefficient calculator 325 can generate 100 spectral signatures—as samples—for one second of audio in audio file 390 and audio file 392. Spectral coefficient calculator 325 provides these spectral signatures to spectral signature correlator 331, which, in some embodiments, can be configured to calculate correlations among the spectral signatures for audio file 390 and audio file 392 to form calculated correlations.

In this example, spectral signature correlator 331 includes a spectral signature distance engine 333, a pattern detector 335, and a pattern parametric manager 337. In a specific embodiment, spectral signature distance engine 333 is configured to determine a distance representing a correlation—or a degree of correlation—between multiple spectral signatures from, for example, audio files 390 and 392. As such, spectral signature correlator 331 can determine a distance that is indicative of whether spectral signatures associated with audio file 390 are equivalent (or substantially equivalent) to spectral signatures associated with audio file 392. As used herein, the term "distance," at least in one embodiment, can refer to any measure that can be used to determine the degree of similarity between two or more spectral signatures.

In one embodiment, spectral signature distance engine 333 computes a distance from one spectral signature ("SS1") to another spectral signature ("SS2") as follows: Distance=Distance+$\log_{10}(1+\sqrt{((SS1-SS2)^2)})$, for summation over "N" coefficients. Further, SS1=[Ceps1($i$)−means1($i$)]/std(i), and SS2=[Ceps2($j$)−means2($j$)]/std(j), where Ceps1($i$) is the $i^{th}$ coefficient for audio file 390, means1($i$) is the $i^{th}$ mean for audio file 390, std(i) is the $i^{th}$ standard deviation, Ceps2($j$) is the $j^{th}$ coefficient for audio file 392, means2($j$) is the $j^{th}$ mean for audio file 392, std(j) is the $j^{th}$ standard deviation.

Pattern parametric manager 337, among other things, is configured to manage the determination of whether a specific distance is sufficient to deem two spectral signatures as being associated with the same portion of audio (or substantially so). For example, pattern parametric manager 337 can set a threshold below which a distance is sufficiently short enough for corresponding spectral signatures to be considered as being part of the same portion of audio. In some cases, this threshold is referred to as a trough distance.

Pattern detector 335 can be configured to detect whether a pattern of spectral signatures—or any other spectral characteristic—an be determined, whereby a pattern (i.e., an acoustic pattern) can be indicative of whether matching portions of audio can be identified. In one embodiment, pattern detector 335 can operate to detect patterns in which the distances for the portions of the audio are substantially coextensive to, for example, a linear relationship. That is, the distances indicating a match for the portions of the audio track each other as time linearly progresses (e.g., for each $1/100^{th}$ of a second) for both audio files 390 and 392. Detected patterns can be output as matched audio portion(s).

Optionally, spectral audio matcher 321 can provide the matched audio portion (or identifiers thereof) to audio/video synchronizer 350 to synchronize audio and/or video at a synchronization point. In one embodiment, audio/video synchronizer 350 includes a cross-correlator 352 that is configured to perform a cross-correlation operation for synchronization purposes. The cross-correlation operation can implement known statistics to use cross-correlation to measure the similarity of two signals. Further, if the audio files in audio files 390 and 392 are offset from each other in relation to time, then the cross-correlation operation can figure out the offset for aligning—or synchronizing—audio files 390 and 392. In one embodiment, cross-correlator 352 correlates audio in a 1 second interval for each of audio files 390 and 392.

Figure 4:
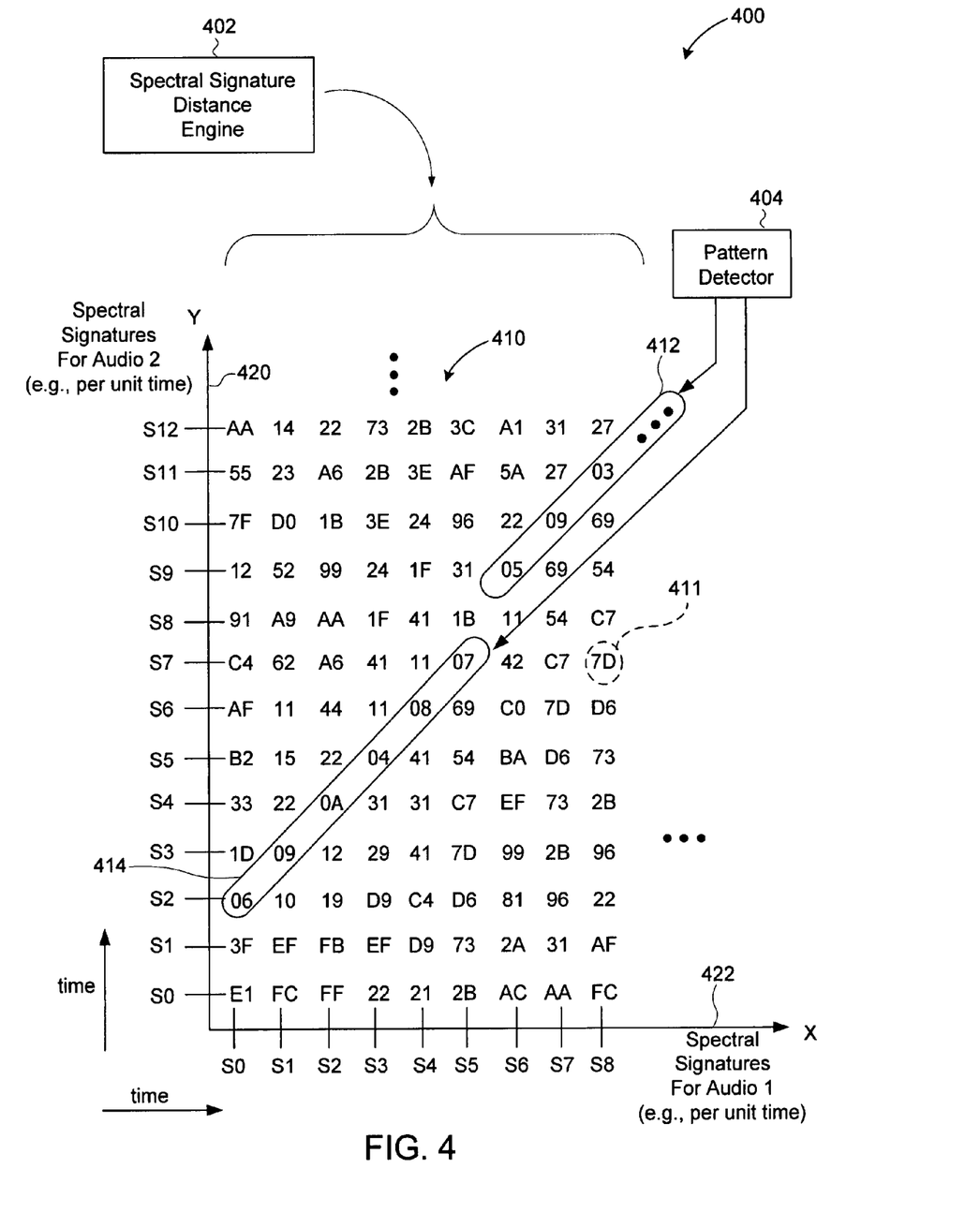
FIG. 4 is a diagram depicting the operation of a spectral signature distance engine and a pattern detector, according to at least one embodiment of the invention.

FIG. 4 is a diagram 400 depicting the operation of a spectral signature distance engine and a pattern detector, according to at least one embodiment of the invention. In this example, spectral signature distance engine 402 is configured to generate a number of distance values 410 between spectral signatures 422 at sample times S0, S1, S2, etc., on the X-axis, and spectral signatures 420 at sample times S0, S1, S2, etc., on the Y-axis. Note that the distances shown are in hexadecimal numbers and the quantities are for illustration purposes. As such, the distance 411 having a magnitude of "7D" represents the distance between a cepstral coefficient (not shown) at sample time S8 for audio 1 and another cepstral coefficient (not shown) at sample time S7 for audio 2. Further to this example, consider that a pattern parametric manager (not shown) sets forth a trough threshold of 0x0C, which is a hexadecimal representation of 12 in base 10 (i.e., which is 5% of 255). As such, pattern detector 404 can detect distances of less than 0x0C. Here, pattern detector 404 is shown to have detected a first grouping 414 (or sequence) and a second grouping 412 (or sequence), both of which include distances of less than 0x0C. As the distances represent amplitudes in a Z-axis (not shown), first grouping 414 and second grouping 412 can be viewed as "troughs" among other higher-valued distances that exhibit lesser degrees of correlation among spectral signatures. It is in association with these troughs that pattern detector 404 can determine whether portions of audio in audio files 390 and 392 (FIG. 3B) match or substantially match in relation to the troughs.

An acoustic pattern identifier implementing spectral signature distance engine 402 and pattern detector 404 can determine matching audio portions for audio captured during multiple takes of the same scene, according to at least one embodiment of the invention. To illustrate, consider the following in which two different people are interacting with each other. In this case, first grouping 414 can relate to audio (i.e., speech) generated by a first person, whereby second grouping 412 can relate to audio generated by a second person.

Note that second grouping 412 begins approximately after first grouping 414 finishes at S5 (of the X-axis). As such, the two persons speak in substantially a consecutive, non-overlapping fashion. Further, the timing between the two audio files is fairly synchronized as evidenced by, for example, the equivalent duration for first grouping 414, which spans 5 units of time in both audio 1 (e.g., S0 to S5) of the X-axis and audio 2 (e.g., S2 to S7) of the Y-axis. Audio files 1 and 2 can have a higher degree of synchronization should audio 2 begin at S0 of the Y-axis (not shown), which would be in synchronicity with audio 1 beginning at S0 of the X-axis.

Note, too, that the speech delivered in both audio 1 and audio 2 relating to first grouping 414 is shown to be spoken at approximately the same speed. For purposes of discussion, consider that the slope of a linear relationship coextensive with a diagonal line (not shown) defined by first grouping 414 is 45 degrees. In cases where audio 2 is delivered more slowly than audio 1, then one would expect the slope of the linear relationship to increase over 45 degrees because audio 2, which otherwise covers 5 units of time, would be extended to, for example, 6-8 units of time (not shown). The opposite can be true for cases in which audio 2 is delivered more quickly than audio 1.

Moreover, consider an instance in which the first person adds or omits utterances or speech in audio 2 relative to audio 1. While spectral signature distance engine 402 might generate some distances that are not within a trough distance (i.e., indicating mismatches in audio) for some samples (or spectral signatures) due to, for example, an omitted "uh" sound, pattern detector 404 can nevertheless operate to determine a pattern, such as first grouping 414, based on a tolerance for such variances in speech.

Note further that in some instances in which multiple people speak at the same time, such as in a situation in which two people in a coffee shop each give an exact, same order for coffee at the same time. Since their speech overlaps each other, spectral signature distance engine 402 might generate distances that may or may not be associated with higher values of distances (e.g., signifying less of a match). But pattern detector 404 can nevertheless operate to determine a pattern based on a tolerance for such variances in speech and/or spectral signatures. In view of the foregoing example, an acoustic pattern identifier can match audio portions for first grouping 414 regardless of the differences in the rate of speech or audio between audio 1 and audio 2, as well as the differences in utterances or speech (i.e., different portions of speech) in audio 2 relative to audio 1.

Figure 5:
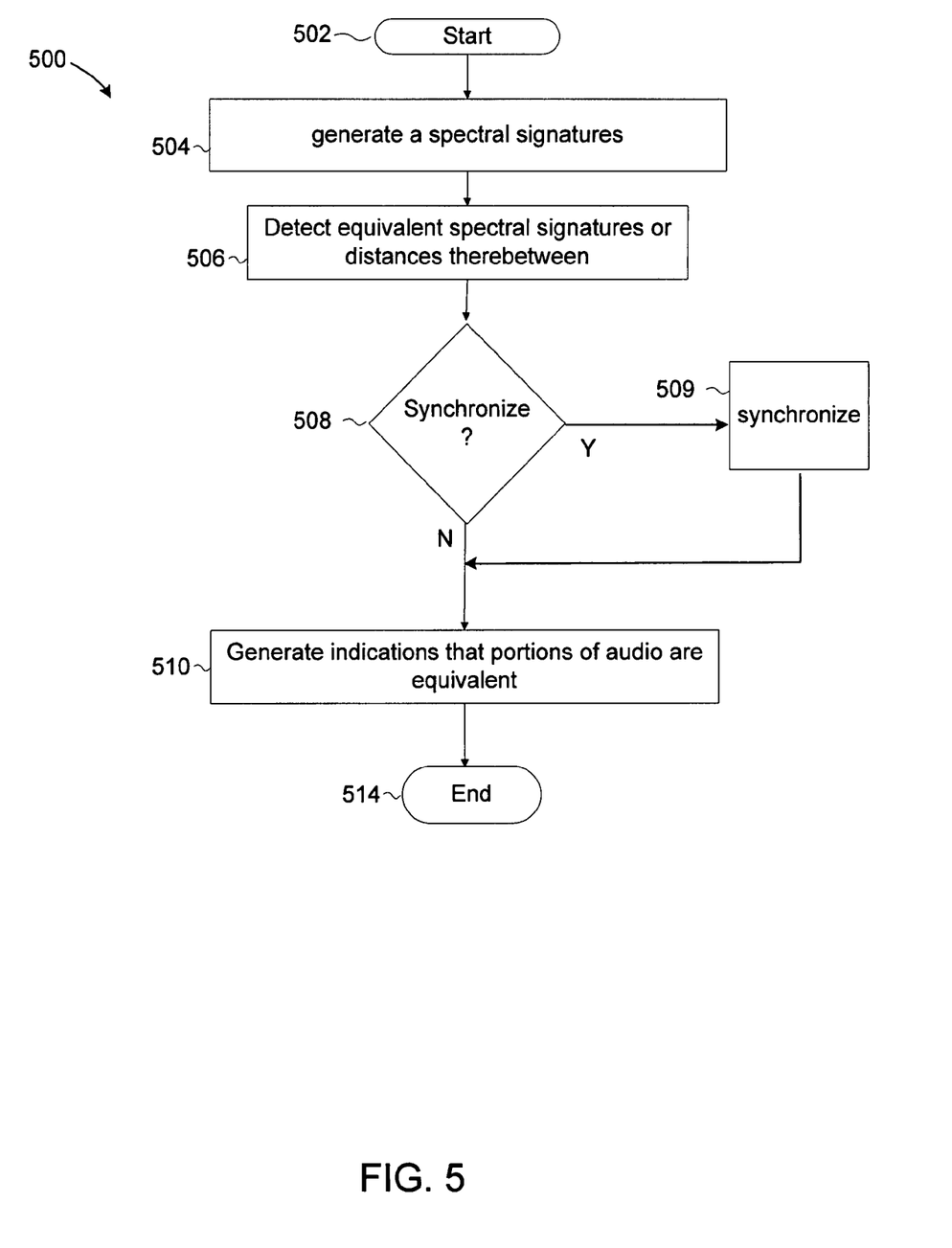
FIG. 5 is a flow diagram depicting one example of a method for synchronizing video and/or audio based on the generation of synchronization points derived from an acoustic pattern identifier, according to one embodiment of the invention.

FIG. 5 is a flow diagram depicting one example of a method for synchronizing video and/or audio based on the generation of synchronization points derived from an acoustic pattern identifier, according to one embodiment of the invention. As shown, flow 500 begins at 502, with an interface, a processor, an application and/or logic, generating spectral signatures as a function of, for example, linear predicted-based cepstral coefficients. Flow 500 analyzes spectral signatures at 506 to determine whether portions of audio are equivalent or are substantially equivalent. Next, flow 500 optionally can determine at 508 whether to synchronize audio. If so, flow 500 synchronizes the audio portions at 509. In at least one embodiment, flow 500 generates one or more indications that audio portions match at 510. Such an indication can include matched audio portion identifiers. Flow 500 terminates at 514.

Figure 6:
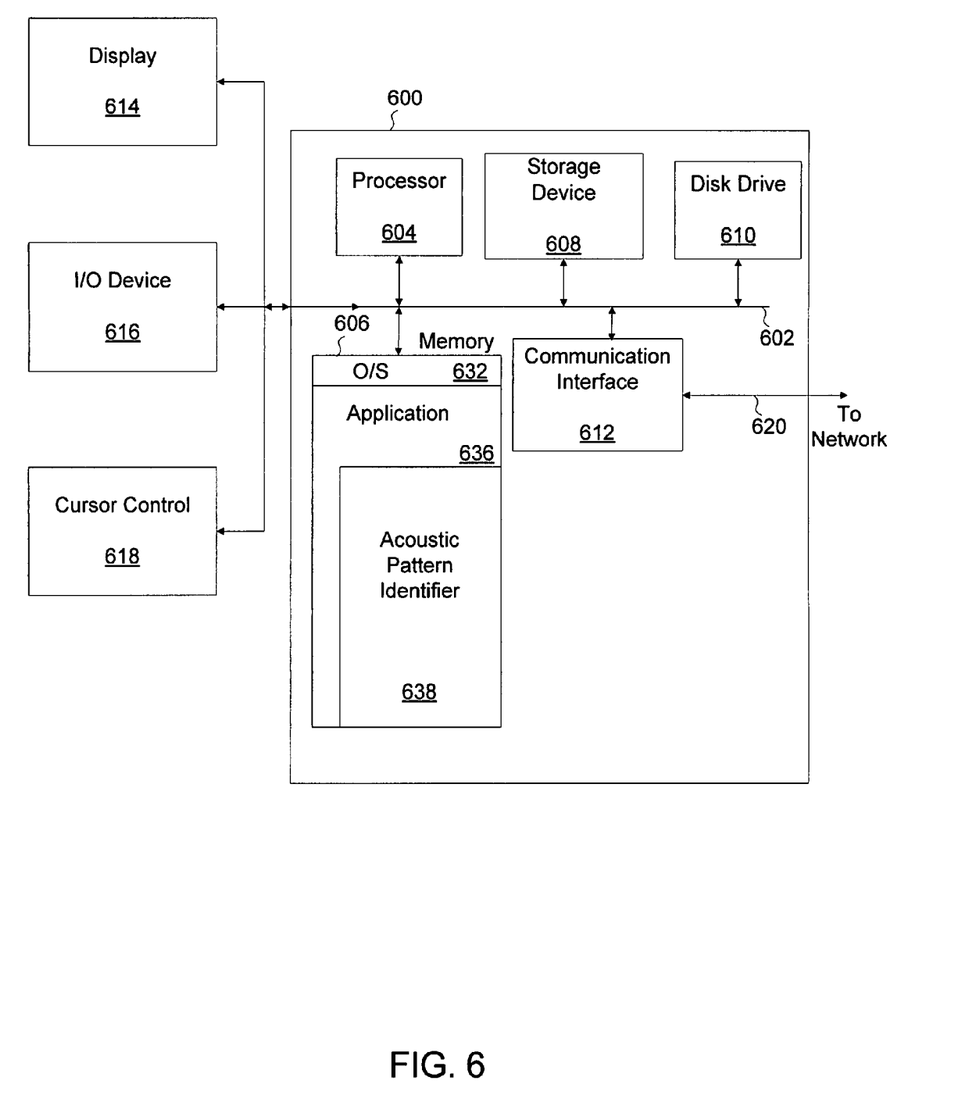
FIG. 6 illustrates an exemplary computer system suitable for implementing an acoustic pattern identifier, according to at least one embodiment of the invention.

FIG. 6 illustrates an exemplary computer system suitable for implementing an acoustic pattern identifier, according to at least one embodiment of the invention. In some examples, computer system 600 can be used to implement computer programs, applications, methods, processes, or other software to perform the above-described techniques and to realize the structures described herein. Computer system 600 includes a bus 602 or other communication mechanism for communicating information, which interconnects subsystems and devices, such as processor 604, system memory ("memory") 606, storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and pointer cursor control 618 (e.g., mouse or trackball). In one embodiment, pointer cursor control 618 invokes one or more specialized commands that, at least in part, either accepts or rejects a synchronization point to enable an editor modify the synchronization point determination process. Pointer cursor control 618 can interact via a pointer cursor with a panel to effectuate the synchronization of audio tracks using the synchronization points described in the various embodiments of the invention. In other examples, the above-described techniques and elements can be varied in design, implementation, and function and are not limited to the descriptions provided.

According to some examples, computer system 600 performs specific operations in which processor 604 executes one or more sequences of one or more instructions stored in system memory 606. Such instructions can be read into system memory 606 from another computer readable medium, such as static storage device 608 or disk drive 610. In some examples, hard-wired circuitry can be used in place of or in combination with software instructions for implementation. In the example shown, system memory 606 includes modules of executable instructions for implementing an operation system ("O/S") 632, an application 636 (e.g., a host, client, web services-based, distributed (i.e., enterprise), application programming interface ("API"), program, procedure or others), and an audio synchronization point generation module 638.

The term "computer readable medium" refers, at least in one embodiment, to any medium that participates in providing instructions to processor 604 for execution. Such a medium can take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 600. According to some examples, two or more computer systems 600 coupled by communication link 620 (e.g., LAN, PSTN, or wireless network) can perform the sequence of instructions in coordination with one another. Computer system 600 can transmit and receive messages, data, and instructions, including program code (i.e., application code) through communication link 620 and communication interface 612. Received program code can be executed by processor 604 as it is received, and/or stored in disk drive 610, or other non-volatile storage for later execution. In one embodiment, system 600 is implemented as a hand-held device But in other embodiments, system 600 can be implemented as a personal computer (i.e., a desk top computer) or any other computing device.

In at least some of the embodiments of the invention, the structures and/or functions of any of the above-described elements can be implemented in software, hardware, firmware, circuitry, or a combination thereof. Note that the structures and constituent elements described above, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

What is claimed:

1. A computer-readable storage medium, excluding signals per se, comprising executable instructions to perform:
    analyzing a plurality of content items, the content items including a video portion and an audio portion, and the content items being from multiple takes captured from a same scene in substantially a consecutive, non-overlapping fashion during different intervals of time;
    determining matching audio portions of the content items based at least in part on spectral signatures of the audio portions of the content items, the spectral signatures differing from each other due to deviations comprising different rates of delivery of speech or differing utterances in the audio portions of the content items; said determining comprises calculating that the spectral signatures of the matched audio portions are substantially acoustically equivalent regardless of the deviations comprising different rates of delivery of speech or differing utterances; and
    synchronizing the video portions of the content items based at least in part on said determining matching audio portions of the content items.

2. The computer-readable storage medium of claim 1, wherein the multiple takes are captured with a single camera.

3. The computer-readable storage medium of claim 1, wherein the executable instructions for determining the matching audio portions of the content items exclude executable instructions to either determine a phoneme or a word, or both.

4. The computer-readable storage medium of claim 1, wherein the executable instructions for synchronizing the video portions of the content items are configured to execute after the content items are captured.

5. The computer-readable storage medium of claim 1, wherein the executable instructions comprise executable instructions to generate the spectral signatures using at least a frequency domain; and said synchronizing the video portions is based in a time domain.

6. The computer-readable storage medium of claim 1, wherein:
    the executable instructions for determining the matching audio portions of the content items based at least in part on the spectral signatures comprise executable instructions to:
        generate the spectral signatures from the audio portions; and
        calculate correlations among the spectral signatures.

7. The computer-readable storage medium of claim 6, wherein the executable instructions to calculate the correlations among the spectral signatures comprise executable instructions to:
    determine that the calculated correlations among the spectral signatures indicate that the matched audio portions are substantially acoustically equivalent.

8. The computer-readable storage medium of claim 6, wherein the executable instructions to calculate the correlations among the spectral signatures comprise executable instructions to:
    detect patterns in which the calculated correlations for the matched audio portions are substantially coextensive to a linear relationship.

9. The computer-readable storage medium of claim 1, wherein the executable instructions to synchronize the video portions of the content items comprise executable instructions to perform a cross-correlation operation.

10. The computer-readable storage medium of claim 1, wherein the executable instructions to determine the matching audio portions based at least in part on the spectral signatures comprise executable instructions to determine the matching portions of the audio portions based at least in part on spectral coefficients forming the spectral signatures.

11. The computer-readable storage medium of claim 1, wherein calculating that the spectral signatures of the matched audio portions are substantially equivalent using an inverse z-transform of the logarithm of the spectral signatures comprising calculating a distance between two spectral signatures utilizing the following:
    distance=distance+$\log_{10}(1+\text{sqrt}((SS1-SS2)^2))$, for summation over N cepstral coefficients;
    where SS1=[Ceps1($i$)−means1($i$)]/std($i$);
    SS2=[Ceps2($j$)−means2($j$)]/std($j$);

Ceps1($i$) is the $i^{th}$ cepstral coefficient for a first audio portion, means1($i$) is the $i^{th}$ mean for the first audio portion, std(i) is the $i^{th}$ standard deviation; and Ceps2($j$) is the $j^{th}$ cepstral coefficient for a second audio portion, means2($j$) is the $j^{th}$ mean for the second audio portion, std(j) is the $j^{th}$ standard deviation.

12. The computer-readable storage medium of claim 1, wherein the multiple takes are captured from different angles and the video portions of the content items differ from each other due to the different angles.

13. A computer-readable storage medium, excluding signals per se, comprising executable instructions to perform:
analyzing a plurality of content items, each content item including a captured audio portion and a captured video portion of a same scene, wherein the content items are captured from different takes of a same scene, and are captured in substantially a consecutive, non-overlapping fashion during different intervals of time;
said analyzing comprises generating sequences of cepstral coefficients comprising spectral signatures of the captured audio portions of the content items;
correlating a first of the sequences of cepstral coefficients, comprising the spectral signature of a captured audio portion of a first content item, to a second of the sequences of cepstral coefficients, comprising the spectral signature of a captured audio portion of a second content item,
the spectral signature of the captured audio of the first content item differing from spectral signature of the captured audio of the second content item due to deviations comprising different rates of delivery of speech or differing utterances;
said correlating determines a degree of correlation between the first captured audio portion and the second captured audio portion regardless of the deviations comprising different rates of delivery of speech or differing utterances;
generating an indication that the first captured audio portion and second captured audio portion are substantially acoustically equivalent matching audio portions, and said generating is based at least in part on the determined degree of correlation between the first captured audio portion and the second captured audio portion; and
synchronizing a captured video portion of the first content item with a captured video portion of the second content item based at least in part on said generating.

14. The computer-readable storage medium of claim 13, wherein the executable instructions to correlate the first of the sequences of cepstral coefficients to the second of the sequences of cepstral coefficients comprise executable instructions to perform:
said determining the degree of correlation when the captured audio portion of the first content item includes speech that is spoken at a different cadence than speech included in the captured audio portion of the second content item.

15. The computer-readable storage medium of claim 13, wherein said correlating determines the degree of correlation indicating that the captured audio portion of the first content item and the captured audio portion of the second content item are substantially acoustically equivalent regardless of a sound that is included in the captured audio portion of the first content item but that is omitted from the captured audio portion of the second content item.

16. The computer-readable storage medium of claim 13, wherein the executable instructions to characterize the captured audio portions comprise executable instructions to generate the cepstral coefficients as linear prediction-based cepstral coefficients.

17. The computer-readable storage medium of claim 13, wherein the executable instructions to correlate the first of the sequences of cepstral coefficients to the second of the sequences of cepstral coefficients comprise executable instructions to determine distances in association with the first of the sequences of cepstral coefficients and the second of the sequences of cepstral coefficients.

18. The computer-readable storage medium of claim 13, wherein the first content item and the second content item are captured with different cameras during the two different intervals of time.

19. The computer-readable storage medium of claim 13, wherein the first content item and the second content item are captured with one camera during the two different intervals of time.

20. The computer-readable storage media of claim 13, wherein determining said degree of correlation comprises calculating a distance between two spectral signatures utilizing the following:
distance=distance+$\log_{10}(1+\sqrt{((SS1-SS2)^2)})$, for summation over N cepstral coefficients;
where SS1=[Ceps1($i$)−means1($i$)]/std(i);
SS2=[Ceps2($j$)−means2($j$)]/std(j);
Ceps1($i$) is the $i^{th}$ cepstral coefficient for a first captured audio portion, means1($i$) is the $i^{th}$ mean for the first captured audio portion, std(i) is the $i^{th}$ standard deviation; and
Ceps2($j$) is the $j^{th}$ cepstral coefficient for a second captured audio portion, means2($j$) is the $j^{th}$ mean for the second captured audio portion, std(j) is the $j^{th}$ standard deviation.

21. A device, comprising:
a spectral audio matcher comprising:
a spectral signature generator configured to:
analyze a plurality of content items, the content items: including a respective video portion, a respective audio portion, are from different takes of a same scene captured in substantially a consecutive, non-overlapping fashion during different intervals of time, and the respective audio portions of the content items differ from each other due to deviations comprising different rates of delivery of speech or differing utterance;
generate sequences of cepstral coefficients from captured audio portions of the content items; and
generate spectral signatures of the captured audio portions derived from the sequences of cepstral coefficients;
a spectral signature correlator configured to determine that two or more respective audio portions are substantially acoustically equivalent based at least in part on the spectral signatures, regardless of the deviations comprising different rates of delivery of speech or differing utterances in the two or more audio portions; and
an audio/video synchronizer configured to synchronize two or more video portions of the content items that correspond to the matched portions of two or more respective audio portions based at least in part on the determination that the two or more respective audio portions are substantially acoustically equivalent.

22. The device of claim 21, wherein the generated sequences of cepstral coefficients are linear prediction-based cepstral coefficients.

23. The device of claim 21, wherein the spectral signature correlator is further configured to calculate a degree of correlation based at least in part on an inverse z-transform of the logarithm of the spectral signatures comprising calculating a distance between two spectral signatures utilizing the following:

distance=distance+$\log_{10}$(1+sqrt((SS1−SS2)^2)), for summation over N cepstral coefficients;

where SS1=[Ceps1($i$)−means1($i$)]/std(i);

SS2=[Ceps2($j$)−means2($j$)]/std(j);

Ceps1($i$) is the $i^{th}$ cepstral coefficient for a first respective audio portion, means1($i$) is the $i^{th}$ mean for the first respective audio portion, std(i) is the $i^{th}$ standard deviation; and Ceps2($j$) is the $j^{th}$ cepstral coefficient for a second respective audio portion, means2($j$) is the $j^{th}$ mean for the second respective audio portion, std(j) is the $j^{th}$ standard deviation; and wherein the determination that the two or more captured audio portions are substantially acoustically equivalent is based at least in part on said calculating.

24. A method, comprising:

analyzing a plurality of content items, the content items including a captured audio portion and a captured video portion from a same scene, the capturing occurring in substantially a consecutive, non-overlapping fashion during different intervals of time;

generating sequences of cepstral coefficients from the captured audio portions of the content items;

generating spectral signatures of the captured audio portions of the content items derived from the sequences of cepstral coefficients;

detecting sequences of the spectral signatures having magnitudes that indicate a substantial acoustical match between the captured audio portions of the content items;

calculating that two of the substantially acoustically matched captured audio portions associated with the detected sequences are substantially acoustically equivalent regardless of deviations comprising different rates of delivery of speech or differing utterances; and synchronizing two captured video portions of the content items that are associated with the two substantially acoustically matched captured audio portions based at least in part on said calculating.

25. The method of claim 24, further comprising determining a distance representing a degree of similarity between the captured portions of audio utilizing the following:

distance=distance+$\log_{10}$(1+sqrt((SS1−SS2)^2)), for summation over N cepstral coefficients;

where SS1=[Ceps1($i$)−means1($i$)]/std(i);

SS2=[Ceps2($j$)−means2($j$)]/std(j);

Ceps1($i$) is the $i^{th}$ cepstral coefficient for a first captured audio portion, means1($i$) is the $i^{th}$ mean for the first captured audio portion, std(i) is the $i^{th}$ standard deviation; and Ceps2($j$) is the $j^{th}$ cepstral coefficient for a second captured audio portion, means2($j$) is the $j^{th}$ mean for the second captured audio portion, std(j) is the $j^{th}$ standard deviation; and wherein said calculating is based at least in part on said determining the distance.

\* \* \* \* \*